(12) United States Patent
Tiwari et al.

(10) Patent No.: US 9,683,552 B2
(45) Date of Patent: Jun. 20, 2017

(54) SYSTEM AND METHOD FOR ROBUST WIND TURBINE OPERATION

(71) Applicant: General Electric Company, Schenectady, NY (US)

(72) Inventors: Awadesh Kumar Tiwari, Bangalore (IN); Peter Alan Gregg, Niskayuna, NY (US); Raul Munoz Medina, Queretaro (MX); Achalesh Kumar Pandey, Bangalore (IN); Isaac Alejandro Martinez Tovar, Queretaro (MX)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 14/198,641

(22) Filed: Mar. 6, 2014

(65) Prior Publication Data
US 2015/0252786 A1 Sep. 10, 2015

(51) Int. Cl.
*F03D 7/04* (2006.01)
(52) U.S. Cl.
CPC ............... *F03D 7/04* (2013.01); *F03D 7/046* (2013.01); *F05B 2260/821* (2013.01); *Y02E 10/723* (2013.01)
(58) Field of Classification Search
CPC . F03D 7/04; F03D 7/042; F03D 7/043; F03D 7/044; F03D 7/045; F03D 7/046
See application file for complete search history.

(56) References Cited

U.S. PATENT DOCUMENTS

| | | | |
|---|---|---|---|
| 7,571,013 B2 | 8/2009 | Altemark | |
| 7,987,067 B2 | 7/2011 | Harrison et al. | |
| 8,212,373 B2* | 7/2012 | Wittekind | F03D 7/0276 290/44 |
| 8,523,520 B2* | 9/2013 | Nagasaki | F03D 7/0224 416/1 |
| 8,577,509 B2* | 11/2013 | Ong | F03D 7/0292 290/44 |
| 8,604,633 B2 | 12/2013 | Llombart Estopinan et al. | |

(Continued)

OTHER PUBLICATIONS

Milan et al., "The Stochastic Power Curve Analysis of Wind Turbines", pp. 1-26, Dec. 31, 2008.

(Continued)

*Primary Examiner* — Matthew W Jellett
(74) *Attorney, Agent, or Firm* — Dority & Manning, P.A.

(57) ABSTRACT

The present subject matter is directed to a system and method for optimizing wind turbine operation. For example, the present disclosure is configured to generate operating data for at least one operational parameter of the wind turbine for a predetermined time period. The system can then determine a robustness measurement of at least a portion of the operating data. In general, the robustness measurement indicates the tendency of the operating data to be affected by outliers present in the operating data. In addition, the robustness measurement is typically a function of a distribution of the operating data. The present disclosure is then configured to determine at least one optimal set point for the operational parameter as a function of the robustness measurement and a power production of the wind turbine. The wind turbine can then be operated based on the optimal set point.

17 Claims, 8 Drawing Sheets

(56) References Cited

U.S. PATENT DOCUMENTS

| | | | | |
|---|---|---|---|---|
| 8,803,351 | B2* | 8/2014 | Dalsgaard | F03D 7/0224 290/44 |
| 9,097,236 | B2* | 8/2015 | Zhou | F03D 1/003 |
| 2010/0111693 | A1* | 5/2010 | Wilson | F03D 7/0224 416/1 |
| 2010/0332373 | A1* | 12/2010 | Crabtree | G06Q 50/06 705/37 |
| 2015/0147175 | A1* | 5/2015 | Stoltenjohannes | F03D 11/0091 416/1 |
| 2015/0219074 | A1* | 8/2015 | Babazadeh | F03D 7/048 290/44 |
| 2015/0247953 | A1* | 9/2015 | O'Brien | F03D 17/00 702/3 |

OTHER PUBLICATIONS

Sainz et al., "Robust Filtering for the Characterization of Wind Turbines: Improving its Operation and Maintenance", Energy Conversion and Management, vol. No. 50, Issue No. 9, pp. 2136-2147, Sep. 1, 2009.

Kusiak et al., "Dynamic Control of Wind Turbines", Renewable Energy, vol. No. 35, Issue No. 2, pp. 456-463, Feb. 1, 2010.

Hawkins et al.,"Maximization of Power Capture in Wind Turbines Using Robust Estimation and Lyapunov Extremum Seeking Control", Dec. 31, 2010.

Mathew et al., "Analysis of Wind Regimes and Performance of Wind Turbines", Microbial Degradation of Xenobiotics, pp. 71-83, Jan. 1, 2011.

Gray, "Efficient Wind Farm Performance Analysis & Optimisation Contents", Uptime Engineering, Nov. 30, 2012.

Paiva et al., "Determining Wind Turbine Power Curves Based on Operating Conditions", Wind Energy, vol. No. 17, Issue No. 10, pp. 1563-1575, Dec. 31, 2013.

PCT Search Report and Written Opinion issued in connection with corresponding PCT Application No. PCT/US2015/016322 on Jun. 16, 2015.

* cited by examiner

SYSTEM AND METHOD FOR ROBUST WIND TURBINE OPERATION

FIELD OF THE INVENTION

The present invention relates generally to wind turbines, and more particularly, to systems and methods for robust wind turbine operation.

BACKGROUND OF THE INVENTION

Known wind turbines have a plurality of mechanical and electrical components. For example, a wind turbine generally includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency. Other electrical and/or mechanical components are also included in known wind turbine configurations.

Each electrical and/or mechanical component may have one or more parameters associated with the component that defines one or more operational characteristics of the component. The operational parameters are often set to default values or set points during installation or setup of the wind turbine. However, one or more irregularities may be present within one or more components such that the default values of one or more parameters may not be suitable or optimized for each wind turbine. Further, seasonal variations in environmental or atmospheric conditions in which the wind turbine operates may result in sub-optimal operation.

As such, it is known in the art to optimize wind turbine operation to account for such irregularities and seasonal variations. For example, U.S. Pat. No. 7,987,067 entitled "Method and Apparatus for Optimizing Wind Turbine Operation" describes such a method and is incorporated by reference herein. More specifically, the system and method described in the '067 patent includes defining a plurality of test parameters that include a plurality of test points for at least one wind turbine operational parameter. Each test point includes a plurality of test values for the wind turbine operational parameter. The method also includes defining at least one test sequence of the plurality of test points and initiating a test that executes the plurality of test points within the at least one randomized test sequence and measures at least one operating condition of the at least one wind turbine at each test point.

Accordingly, those of ordinary skill in the art are constantly seeking to develop new and improved systems and methods for optimizing wind turbine operation. Thus, a system and method for robust optimization of a wind turbine that accounts for outliers in data points would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for optimizing an operation of a wind turbine. The method includes generating operating data for at least one operational parameter of the wind turbine for a predetermined time period. The method then determines a robustness measurement of at least a portion of the operating data. The robustness measurement indicates the tendency of the operating data to be affected by outliers present in the operating data. In addition, the robustness measurement may be a function of a distribution of the operating data. A next step of the method includes determining at least one optimal set point for the operational parameter as a function of the robustness measurement and a power production of the wind turbine. As such, the method can operate the wind turbine based on the optimal set point.

In another embodiment, the method may include a step of calculating an uncertainty quantifier of at least a portion of the operating data. Further, the step of calculating the uncertainty quantifier may also include calculating one or more distribution parameters that characterize the operating data, wherein the distribution parameters includes a standard deviation of at least a portion of the operating data and determining the uncertainty quantifier as a function of a standard deviation. In various embodiments, the operating data may include any one of or a combination of a wind speed, one or more power curves, a pitch angle, a yaw angle, a generator speed, a torque output, a temperature, a pressure, a tip speed ratio, a rotor speed, an air density, a predicted power output, a bin average power output, a wind peak, a wind turbulence, a wind shear, or a wind direction.

In a further embodiment, the step of generating operating data may further include at least one of monitoring operating data via one or more sensors or estimating operating data via a computer model.

In additional embodiments, the step of determining the robustness measurement of at least a portion of the operating data may further include utilizing at least one of: a standard deviation of the at least one operational parameter, a breakdown point, an influence function, a trimmed mean of the at least one operational parameter, a sensitivity curve, or similar. Further, the step of determining the robustness measurement may also include calculating a partial differentiation with respect to at least one of the standard deviation, an infinitesimal change in input parameters, or a perturbation around an equilibrium point of one or more operational parameters.

In still another embodiment, the method may include calculating a standard deviation for a plurality of operational parameters and determining a difference or delta between the standard deviations of each of the operational parameters.

In yet another embodiment, the method may further include determining the at least one optimal set point for the operational parameter as a function of an Annual Energy Production (AEP) gain of the wind turbine. In a further embodiment, the AEP gain may include a ratio of the AEP at the optimal set point and the AEP at a baseline or initial set point.

In yet another embodiment, the step of determining the at least one optimal set point for the operational parameter may further include utilizing a multi-objective optimization function. For example, in various embodiments, the multi-objective optimization function may include at least one of a cost function, a loss function, or a transfer function. In a further embodiment, the step of determining the optimal set point for the operational parameter may include: generating an optimal power curve based on the multi-objective optimization function, and determining the optimal set point based on the optimal power curve. In one embodiment, the optimal power curve may be a Pareto frontier. In yet another embodiment, the optimal set point may include a set point for at least one of the following: a pitch angle, a yaw angle, a generator speed, a power output, a torque output, and a rotor speed.

In another aspect, the present subject matter is directed to a system for optimizing an operation of a wind turbine. The system generally includes a processor communicatively coupled to one or more sensors and a controller communicatively coupled to the processor. The processor may be configured to: generate operating data for at least one operational parameter of the wind turbine for a predetermined time period, determine a robustness measurement of at least a portion of the operating data, and determine at least one optimal set point for the operational parameter as a function of the robustness measurement and a power production of the wind turbine. The robustness measurement generally indicates the tendency of the operating data to be affected by outliers present in the operating data. In addition, the robustness measurement may be a function of a distribution of the operating data. Further, the controller may be configured to operate the wind turbine based on the optimal set point.

In yet another aspect, the present subject matter is directed to a method for optimizing an operation of a wind turbine. The method includes operating the wind turbine at a plurality of different test points for at least one operational parameter of the wind turbine. A next step of the method may include generating operating data based on operating the wind turbine at each of the different test points. The method also includes determining a robustness measurement of at least a portion of the operating data. The robustness measurement generally indicates the tendency of the operating data to be affected by outliers present in the operating data. In addition, the robustness measurement may be a function of a distribution of the operating data. The method also includes determining at least one optimal set point for the operational parameter as a function of the robustness measurement and a power production of the wind turbine. As such, the method also includes operating the wind turbine based on the operating set point.

In another embodiment, the method may include a step of calculating an uncertainty quantifier of at least a portion of the operating data. In one embodiment, the step of calculating the uncertainty quantifier may include calculating one or more distribution parameters that characterize the operating data, wherein the distribution parameters includes a standard deviation of at least a portion of the operating data, and determining the uncertainty quantifier as a function of a standard deviation. Further, the operating data may include any one of or a combination of a wind speed, one or more power curves, a pitch angle, a yaw angle, a generator speed, a torque output, a temperature, a pressure, a tip speed ratio, a rotor speed, an air density, a predicted power output, a bin average power output, a wind peak, a wind turbulence, a wind shear, or a wind direction.

In still another embodiment, the step of generating operating data may further include at least one of monitoring operating data via one or more sensors or estimating operating data via a computer model.

In yet another embodiment, the step of determining the robustness measurement of at least a portion of the operating data may further include utilizing at least one of: a standard deviation of the at least one operational parameter, a breakdown point, an influence function, a trimmed mean of the at least one operational parameter, a sensitivity curve, or similar. Further, the step of determining the robustness measurement may further include calculating a partial differentiation with respect to at least one of the standard deviation, an infinitesimal change in input parameters, or a perturbation around an equilibrium point of one or more operational parameters.

In another embodiment, the step of determining the at least one optimal set point for the wind turbine may include utilizing a multi-objective optimization function, generating an optimal power curve based on the multi-objective optimization function, and determining the optimal set point based on the optimal power curve. In one embodiment, the multi-objective optimization function may include at least one of a cost function, a loss function, or a transfer function.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for optimizing operation of a wind turbine. For example, in one embodiment, the present disclosure generates operating data for the wind turbine for a predetermined time period, determines a robustness measurement of the operating data, and determines one or more optimal set points for the wind turbine as a function of the robustness. More specifically, in a further embodiment, the present subject matter determines the optimal set point using a multi-objective framework (e.g. a cost function takes into account the robustness measurement and various uncertainties in the operating data) that generates an optimal operating curve (e.g. Pareto frontier) to determine the optimal control set points for the wind turbine. As used herein, the "measure of robustness" or "robustness measurement" or any similar term is generally understood by those of ordinary skill in the art to describe the data or statistics' resistance to errors produced by deviations from assumptions and/or data that are not unduly affected by outliers. In other words, even if assumptions of the operating data are only approximately accurate, a "robust" data point still has reasonable efficiency and/or reliability. As such, robust methods provide automatic means of detecting, removing, and/or flagging outliers so that manual screening of data may be eliminated and outliers do not affect data analysis. In addition, as used herein, the term "optimized" or "optimal" generally refers to maximizing and/or achieving a desired value or function of one or more performance aspects or combinations of performance aspects of the wind turbine.

The various embodiments of the system and method described herein provide numerous advantages not present in the prior art. For example, the present disclosure ensures robustness of the selected optimal set points for the wind turbine by distinguishing between the optimal set points and any outliers. In addition, the present subject matter does not depend on test points and/or a test sequence, though it can be used in combination with such systems. Further, the present disclosure can reduce operator dependency, thereby increasing the repeatability of the process. Thus, the present subject matter, at a minimum, is capable of providing robust, optimal control set points to improve Annual Energy Production (AEP) of the wind turbine.

Figure 1:
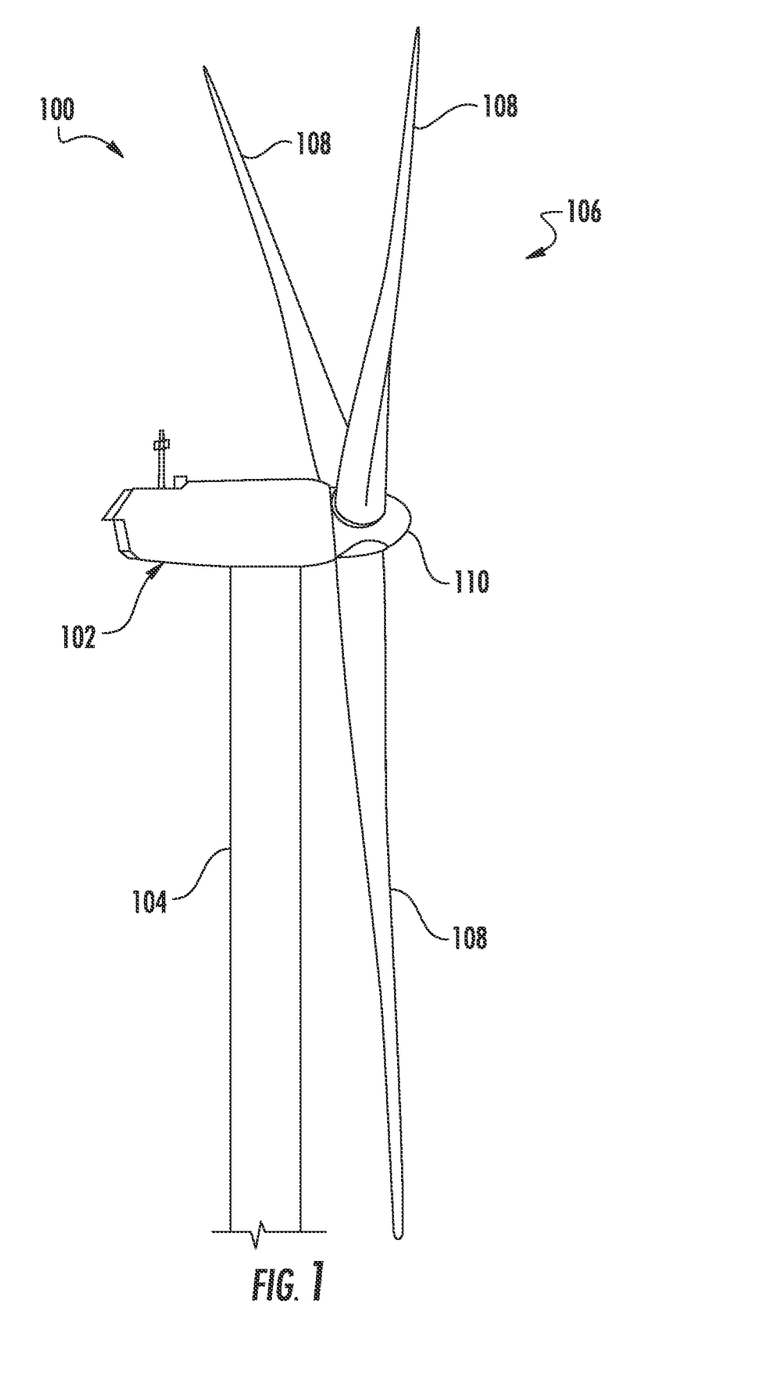
FIG. 1 illustrates a perspective view of a portion of one embodiment of a wind turbine of conventional construction.

Referring now to the drawings, FIG. 1 is a perspective view of a portion of an exemplary wind turbine 100 according to the present disclosure. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
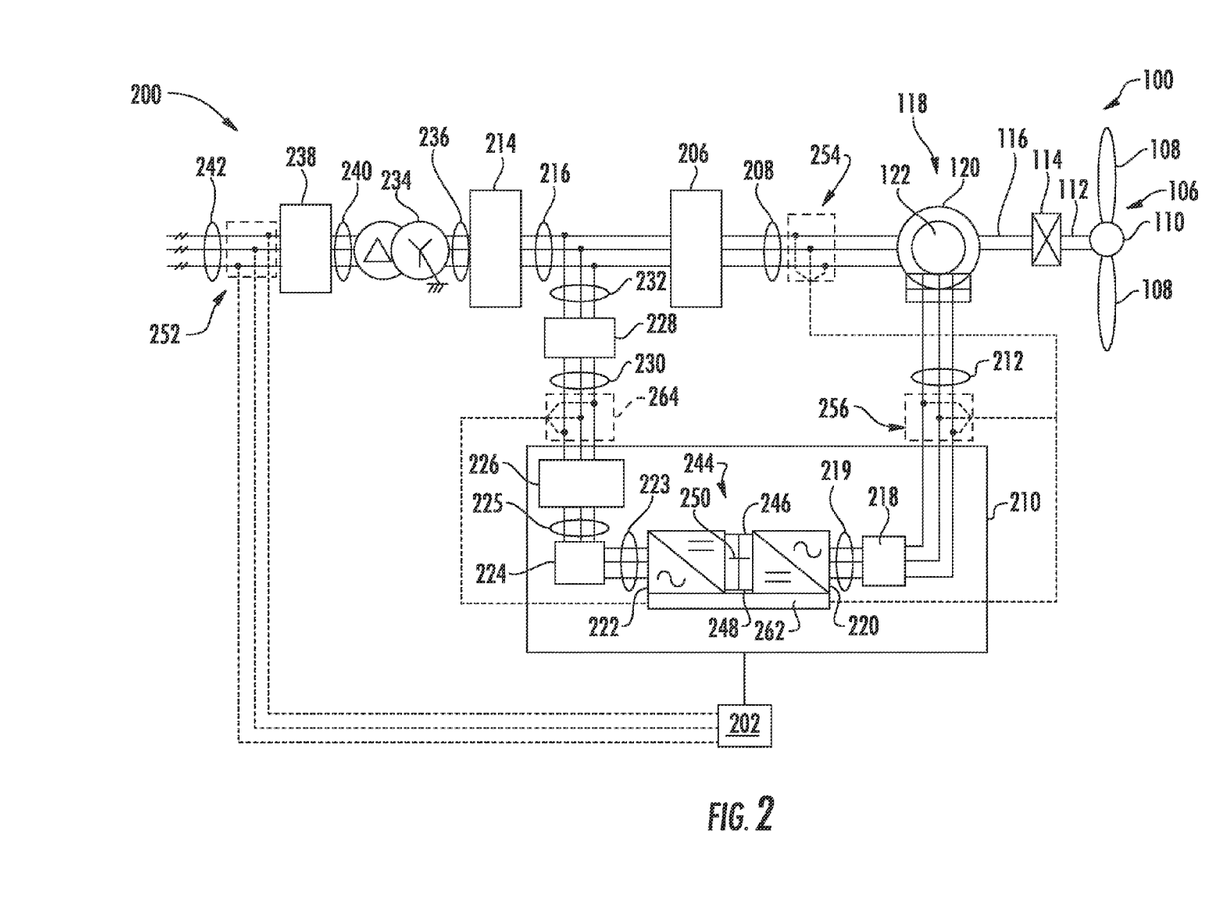
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. More specifically, the components of the electrical and control system 200 of FIG. 2 provide examples of the various components of the wind turbine 100 that may have one or more parameters associated with the component that define one or more operational characteristics of the component (e.g. a set point). As shown, the rotor 106 includes a plurality of blades 108 coupled to the hub 110. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. A rotating magnetic field is induced by the generator rotor 122 and a voltage is induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power is transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

Figure 3:
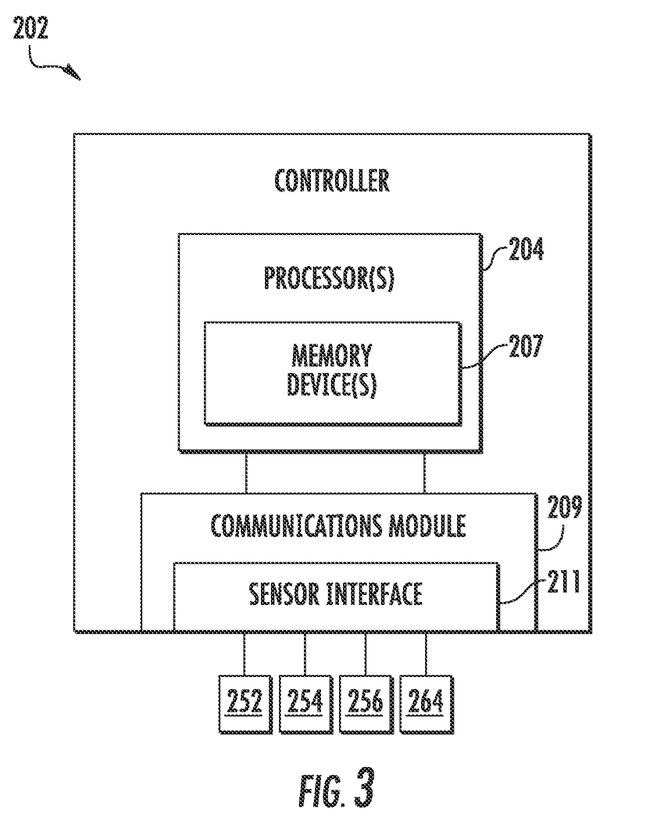
FIG. 3 illustrates a block diagram of one embodiment of a controller suitable for use with the wind turbine shown in FIG. 1.

In addition, the electrical and control system 200 may include a wind turbine controller 202. As shown in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264) may be communicatively coupled to the communications module 209 using any suitable means. For example, as shown in FIG. 3, the sensors 252, 254, 256, 264 are coupled to the sensor interface 211 via a wired connection. However, in other embodiments, the sensors 252, 254, 256, 264 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

As mentioned, the sensors are configured to measure and/or monitor one or more operating parameters of wind turbine 100. In one embodiment, the sensors include, for example, one or more of the following: a first set of voltage and electric current sensors 252, a second set of voltage and electric current sensors 254, a third set of voltage and electric current sensors 256, a fourth set of voltage and electric current sensors 264 (all shown in FIG. 2), one or more blade sensors for measuring a pitch angle of one of the rotor blades 108, one or more generator sensors for monitoring the generator (e.g. torque, rotational speed, acceleration and/or the power output), an accelerometer, and/or various wind sensors for measuring various wind parameters, such as wind speed, wind peaks, wind turbulence, wind shear, changes in wind direction, air density, temperature, pressure, or similar. Further, the sensors may be located near the ground of the wind turbine, on the nacelle, or on a meteorological mast of the wind turbine. It should also be understood that any other number or type of sensors may be employed and at any location. For example, the sensors may be a Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. Further, the sensors and/or devices may be part of the same wind farm, from different wind farms, or independent of any wind farm.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222. The rotor-side power converter 220 and the line-side power converter 222 may have any configuration using any switching devices that facilitate operation of electrical and control system 200 as described herein. Further, the power conversion assembly 210 may be coupled in electronic data communication with the turbine controller 202 to control the operation of the rotor-side power converter 220 and the line-side power converter 222.

In one embodiment, a line-side power converter bus 223 may be electrically coupled to the line-side power converter 222 to a line filter 224. Also, a line bus 225 may be electrically coupled to the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Still referring to FIG. 2, the rotor-side power converter 220 may be coupled in electrical communication with the line-side power converter 222 via a single direct current (DC) link 244. Alternatively, the rotor-side power converter 220 and the line-side power converter 222 may be electrically coupled via individual and separate DC links. As shown, the DC link 244 may include a positive rail 246, a negative rail 248, and at least one capacitor 250 coupled therebetween.

The controller 202 may be configured to receive one or more voltage and/or electric current measurement signals from a first set of voltage and electric current sensors 252. Moreover, the turbine controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein.

Still referring to FIG. 2, the system 200 may also include a converter controller 262 that is configured to receive one or more voltage and electric current measurement signals. For example, in one embodiment, the converter controller 262 receives voltage and electric current measurement signals from the second set of voltage and electric current sensors 254 coupled in electronic data communication with stator bus 208. The converter controller 262 may also receive a third and fourth set of voltage and electric current measurement signals from the third and fourth set of voltage and electric current sensors 256, 264.

Figure 4:
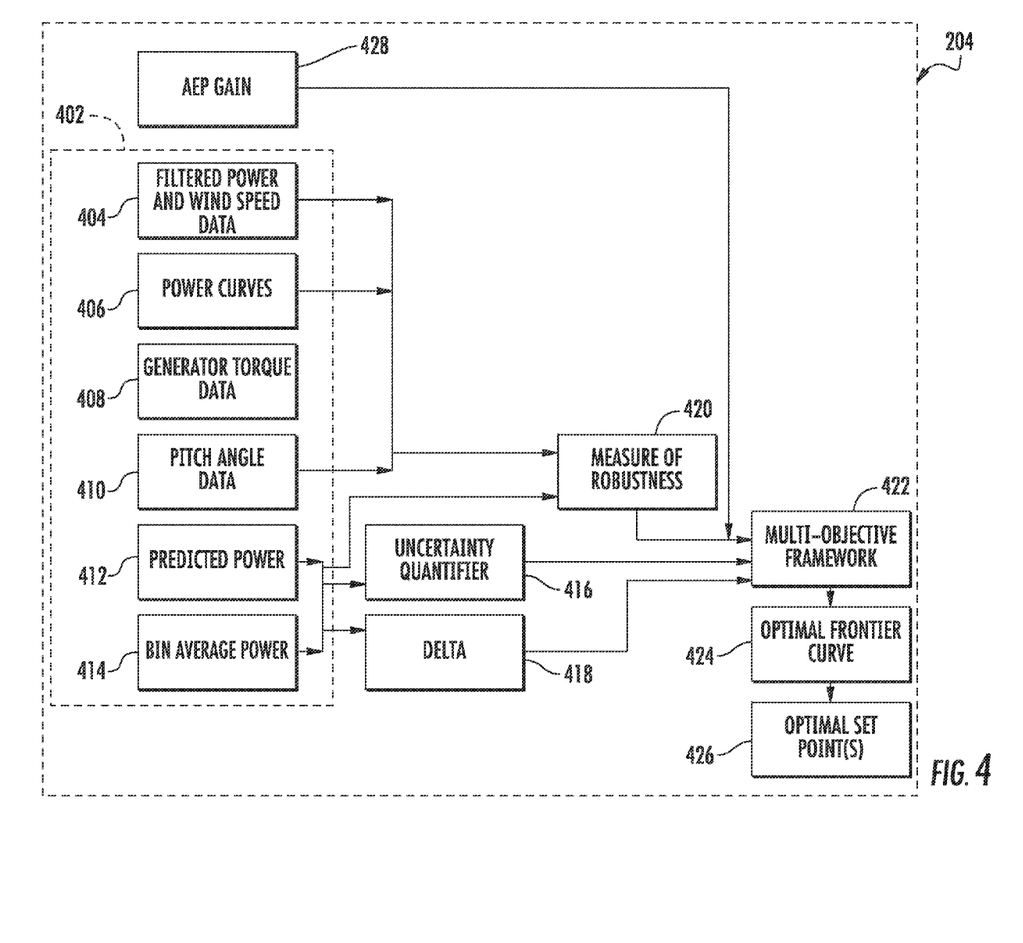
FIG. 4 illustrates a schematic diagram of one embodiment of a processor according to the present disclosure.

Referring now to FIG. 4, the controller 202 is configured to generate operating data 402 for the wind turbine 100 for a predetermined time period. In one embodiment, the operating data 402 may be generated via one or more of the sensors (e.g. via sensors 252, 254, 256, 264 or any other suitable sensor). Alternatively, the operating data 402 may be estimated via a computer model within the processor 204. For example, in one embodiment, the operating data may be estimated using Kalman estimators or filters. A Kalman estimator, sometimes referred to as a linear quadratic estimation, typically refers to an algorithm that uses a series of measurements observed over time (which typically contains noise and/or other inaccuracies), and produces one or more estimates of unknown variables that tend to be more precise than those estimates based on a single measurement alone.

In addition, the operating data 402 may include data points for a single operating parameter or a plurality of operating parameters. In various embodiments, the operating data 402 of wind turbine 100 may include, without limitation, a wind speed, a power output, a torque output, a rotor speed, an air density, an altitude, a wind direction, an ambient temperature, a pressure, one or more power curves, a pitch angle, a yaw angle, a generator speed, a tip speed ratio, a predicted power output, a bin average power output, a wind peak, a wind turbulence, a wind shear, and/or any suitable condition at or within wind turbine 100. For example, as shown in the illustrated embodiment, the operating data 402 may include filtered power and wind speed data 404, power curves 406, predicted power curves 412, bin average power curves 414, generator torque data 408, and pitch offset data 410.

Thus, the controller 202 is configured to determine a robustness measurement 420 of at least a portion of the operating data 402. As mentioned, the robustness measurement of the operating data is generally used to describe the data's resistance to be overly affected by outliers. In various embodiments, the robustness measurement may be a single dimensionless number for each operating parameter. In further embodiments, the robustness measurement may be determined by defining a range of robustness values for each test point and depending upon significance coefficient of that test point, assigning an average robustness number. For example, in one embodiment, the measure of robustness may range from 1 to 10; wherein a "1" is indicative of a very unstable estimate (i.e. a non-robust estimate) and a "10" is indicate of a very robust estimate. It should be understood that any other suitable range may also be utilized to indicate the measure of robustness.

The robustness measurement of the operating data can be determined in a variety of ways, including, but not limited to using: distribution metrics for the operational parameters (e.g. a standard deviation), behavior of the operating data across test points and conditions, a breakdown point, an influence function, a trimmed mean, a sensitivity curve, or any other suitable robustness process and/or calculation known in the art. For example, in one embodiment, the robustness measurement of the operating data 402 may be estimated by determining a distribution of at least a portion of the operating data. More specifically, in another embodiment, the robustness measurement 420 may be determined by calculating the standard deviation of one of the operational parameters and then calculating the partial differentiation with respect to at least one of the standard deviation, an infinitesimal change in input parameters, or a perturbation around an equilibrium point of one or more operational parameters. In a further embodiment, the behavior of the operating data can be analyzed with respect to the inputs (i.e. the operating data reflective of one or more operating parameters) to determine the data spread over time and/or space, e.g. temporal and spatial. Further, the behavior of the data can be analyzed by determining a trending and/or standard deviation or mean of the operating data. The processor 204 can then plot the operating data as a normal bell curve to illustrate the behavior of the data. In addition, by understanding the trend of the operating data, the processor 204 can estimate or predict how the data will behave in a subsequent period of time. In one embodiment, for example, the processor 204 may utilize a Taylor series function to provide an evaluation of the operational parameters at different set points and quantify the change in the function with respect to small changes in the operational parameters. In mathematics, a Taylor series function is generally defined as a representation of a function as an infinite sum of terms that are calculated from the values of the function's derivatives at a single point.

In a further embodiment, the robustness measurement may be determined by calculating the breakdown point. The breakdown point is generally described as the proportion of incorrect observations (e.g. large outliers) that the processor 204 can handle before giving an incorrect (e.g., arbitrarily large) result. As such, the higher the breakdown point, the more robust the operating data or data point is. In another embodiment, the influence function may be utilized to calculate the robustness of the operating data. The influence function is generally referred to as a measure of the dependence of the robustness on the value of one of the other data points in the operating data. As such, the influence function typically relies on calculating the robustness multiple times with different sets of operating data. In regards to the sensitivity curve, instead of relying solely on the data, the processor 204 may implement minor changes to the distributions of the operating data 402 to determine the effect of the change on the robustness. In other words, when using a sensitivity function, the processor 204 assumes a distribution and measures a sensitivity to change in the distribution to determine the robustness. In contrast, the influence function assumes a sample set of operating data and measures a sensitivity to change in the sample. In still another embodiment, the processor 24 may determine the robustness based on a trimmed mean of the operating data. For example, in one embodiment, a fixed percentage of the operating data may be eliminated from each end of ordered operating data, thereby removing at least a portion of the outliers, and the trimmed mean may be determined from the remaining operating data points. In still further embodiments, any other suitable measure of robustness may be utilized by the processor 204.

In still additional embodiments, an uncertainty quantifier may be calculated for one or more of the operating parameters of the operating data 402 to account for uncertainties in the operating data 402. For example, as shown in FIG. 4, an uncertainty quantifier 416 is determined for predicted power 412 and bin average power 414. More specifically, the uncertainty quantifier 416 may be determined by calculating one or more distribution parameters that characterize the operating data. In another embodiment, the distribution parameters may include a standard deviation of at least a portion of the operating data. As such, the uncertainty quantifier 416 may be a function of the standard deviation of one or more operating parameters. Accordingly, the uncertainty quantifier 416 may be an absolute indicator of uncertainties in the operating data 402. As used herein, the "uncertainty quantifier" is generally understood by those of ordinary skill in the art to describe the data's resistance to errors produced by deviations from assumptions. In addition, the uncertainty quantifier may be configured to estimate and assign weightage to sensor signal accuracy.

In addition, a variance or delta 418 may be determined for one or more of the operating parameters. For example, as shown in FIG. 4, the delta 418 or difference is determined between the predicted power 412 and bin average power 412 to account for the difference in the computing methods. In one embodiment, the variance or delta 418 may be determined from the difference of the standard deviations between the predicted power 412 and bin average power 414. As such, the variance 418 may be a relative indicator of uncertainties in the operating data 402.

Still referring to FIG. 4, the robustness measurement 420, any uncertainty quantifiers 416, any variances 418 in the operating data 402, and the Annual Energy Production (AEP) gain 428 may be utilized in a multi-objective framework 422 to determine one or more optimal operating set points 426. The AEP gain, as used herein, is generally defined as the ratio of the AEP at a given or chosen test or set point and the AEP at a baseline test or set point. In addition, a multi-objective framework is generally utilized where optimal decisions need to be made in the presence of trade-offs between two or more conflicting objectives. For example, in one embodiment, optimizing wind turbine operation may include maximizing a power production of the wind turbine 100 while maintaining a fatigue loading of wind turbine 100 within suitable constraints such that a desired operational life of wind turbine 100 is preserved. It should be understood that any suitable combination of performance aspects of the wind turbine 100 may be maximized or set to a desired value or function by optimizing one or more operational parameters. In addition, the multi-objective framework 422 may be any suitable mathematical optimization function known in the art. For example, in one embodiment, the multi-objective framework 422 is capable of generating a cost function that includes the measure of robustness 420, the delta 418 of bin average power 414 and predicted power 412, uncertainty quantifier 416, test point sensitivity, etc. In further embodiments, a loss function and/or a transfer function can be part of the multi-objective framework 422 as constraints and/or as portions of the cost function.

Figure 5:
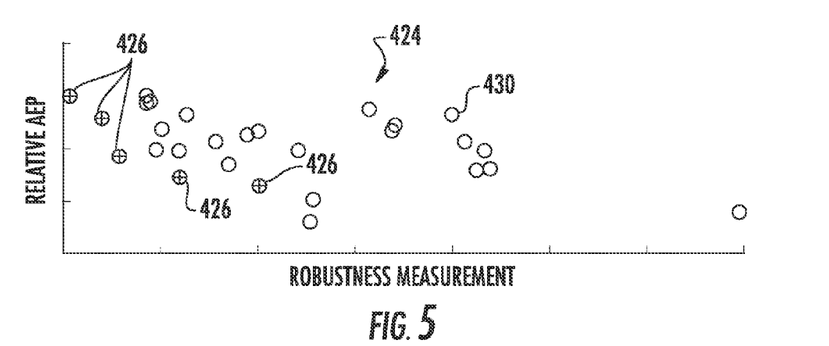
FIG. 5 illustrates one embodiment of a Pareto frontier generated by the processor of FIG. 4 according to the present disclosure.

Referring generally to FIGS. 4 and 5, an optimal operating curve 424 may be generated from the multi-objective framework 422 and one or more optimal set points 426 can be obtained from the curve 424. In one embodiment, the optimal operating curve 424 may be a Pareto frontier. Generally, a Pareto frontier provides a curve that capitalizes on the benefits of computational optimization. As such, in one embodiment, the Pareto frontier 424 may be capable of providing an efficient and effective method of optimization to rapidly compare a plurality of operating data 402 from different operating parameters, and characterize the tradeoff properties within the multi-objective framework 422. For example, in one embodiment, given an initial set of operating set points, a change to the operating set points that makes at least one of the operating parameters better without making any other operating parameter worse is typically referred to as a Pareto improvement. A change is typically referred to as "Pareto optimal" when no further Pareto improvements can be made. More specifically, as shown in FIG. 5, one embodiment of a Pareto frontier 426 is illustrated, wherein the starred data points 426 are Pareto points and form the set of chosen optimal points 426. The remaining data points 430 (e.g. the un-starred data points), therefore, are sub-optimal points. The controller 202 is then configured to operate the wind turbine 100 based on the one or more operating set points 426.

Figure 6:
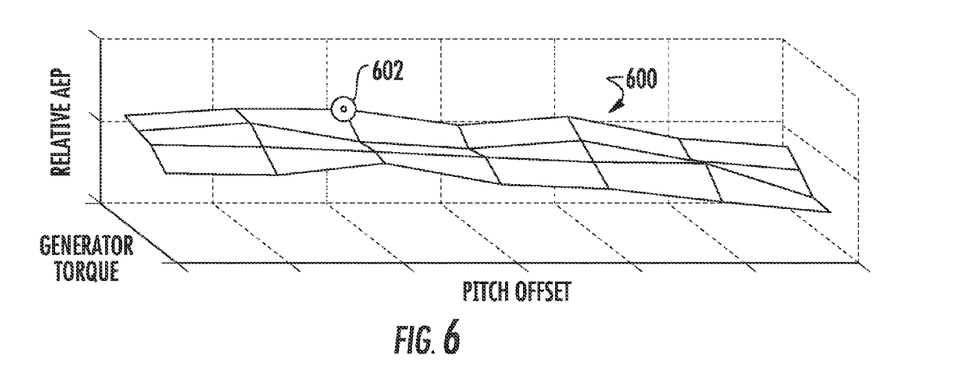
FIG. 6 illustrates one embodiment of a graph of operating data for pitch offset (x-axis) versus generator torque (z-axis) versus relative Annual Energy Production (AEP) (y-axis)
Figure 7:
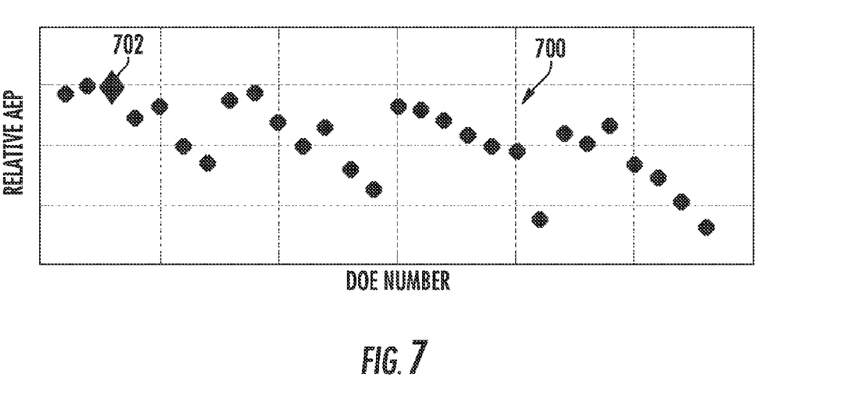
FIG. 7 illustrates one embodiment of a graph of operating data representing generator torque (x-axis) versus relative AEP (y-axis) according to the present disclosure.
Figure 8:
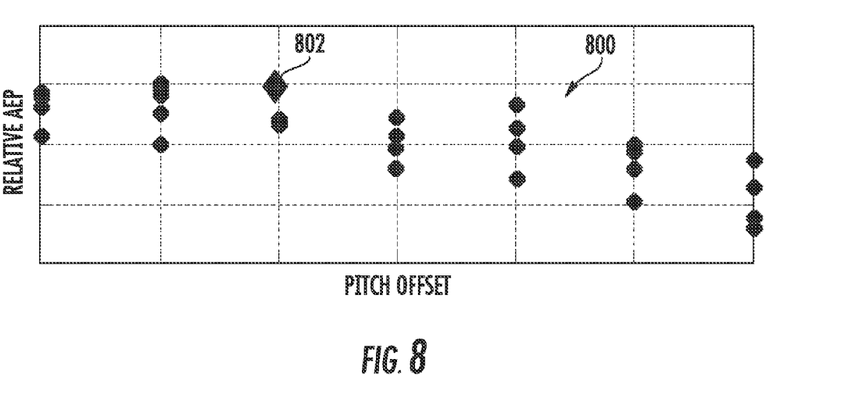
FIG. 8 illustrates one embodiment of a graph of operating data representing pitch angle (x-axis) versus relative AEP (y-axis) according to the present disclosure.

Referring now to FIGS. 6-8, various graphs illustrating the optimal operating data for different operating parameters are shown. FIG. 6 illustrates a graph including operating data 600 for pitch offset (x-axis) of the wind turbine 100 versus generator torque (z-axis) versus relative AEP (y-axis). FIG. 7 illustrates a graph including operating data 700 of test numbers (e.g. Design of Experiment "DOE" number) (x-axis) of the wind turbine 100 versus relative AEP (y-axis). As used herein, the "DOE NUMBER" is a test case number. For example, if 15 different test cases are run, then there would 15 DOE numbers from 1 to 15. FIG. 8 illustrates a graph including operating data 800 for pitch offset (x-axis) of the wind turbine 100 versus relative AEP (y-axis). As shown, the optimal set points 602, 702, 802 are marked with a diamond and have been determined according to the present disclosure. In addition, as illustrated, the optimal set points 602, 702, 802 may not necessarily represent the point with the highest AEP, but represents the most robust data point as determined by the system and method as described herein.

Figure 9:
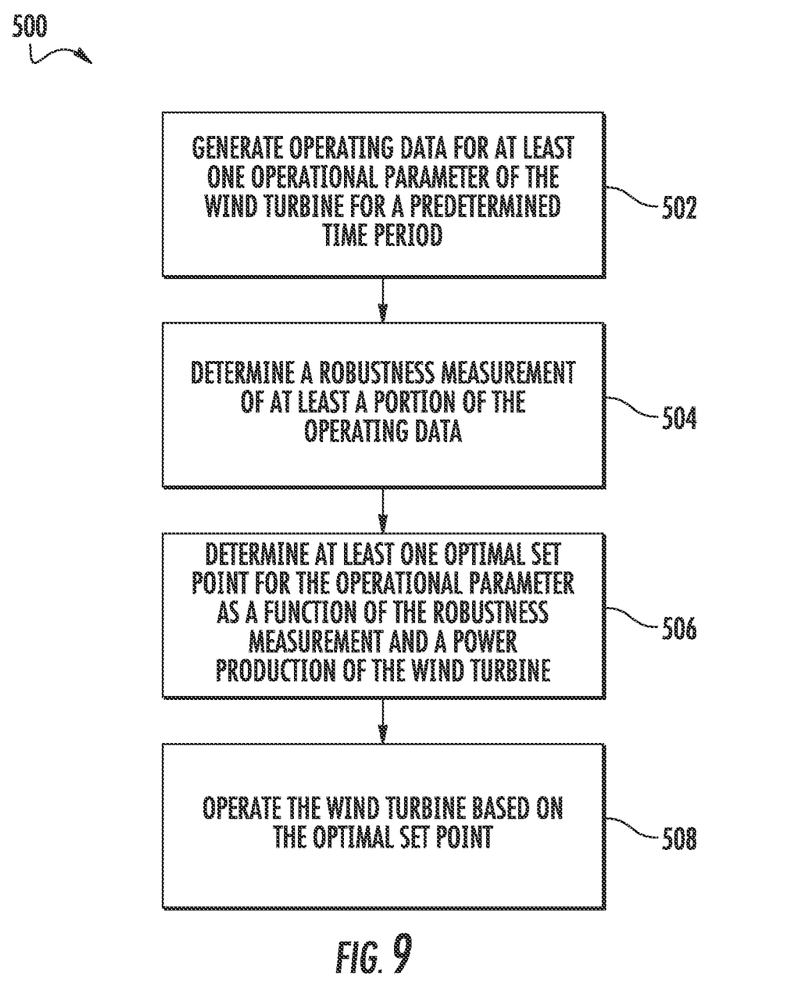
FIG. 9 illustrates a flow diagram of one embodiment of a method for optimizing an operation of a wind turbine according to the present disclosure; and, FIG. 10 illustrates a graph of time (x-axis) versus improvement (y-axis) between various control settings of a wind turbine according to one embodiment of the present disclosure.

Referring to FIG. 9, one embodiment of a method 500 for optimizing an operation of the wind turbine 100 is illustrated. As shown, the method 500 includes a first step 502 of generating operating data for at least one operational parameter of the wind turbine 100 for a predetermined time period. As stated above, the operating data may include a plurality of operating parameters each comprising a plurality of data points. Another step 504 includes determining a robustness measurement of at least a portion of the operating data. The method 500 may also include a step of 506 determining at least one optimal set point for the operational parameter as a function of the robustness measurement and a power production of the wind turbine. The wind turbine 100 may then be operated based on the one or more optimal operating set point (step 508).

Figure 10:
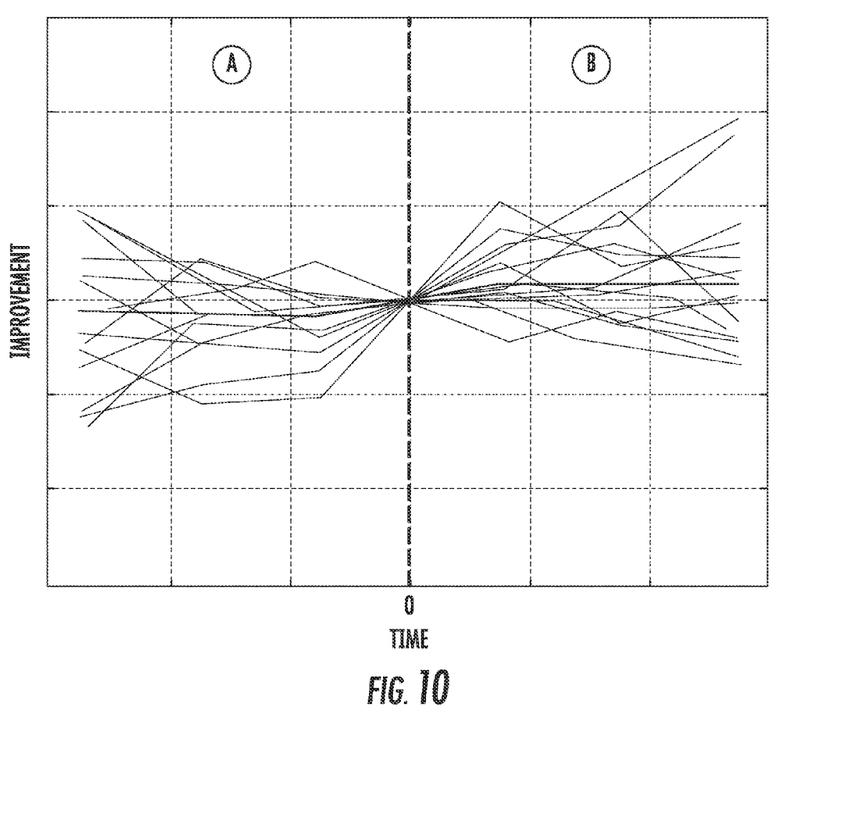

Referring now to FIG. 10, a graph illustrating another method of optimizing wind turbine operation is depicted. As shown, FIG. 10 illustrates a graph of time (x-axis) versus improvement (y-axis) between various control settings of a wind turbine according to one embodiment of the present disclosure. In one embodiment, the controller 202 may be configured to toggle back and forth between two controller settings, e.g. A and B. The improvement (e.g. the direction that power moves across the change in control setting or derivative of power with respect to time) before and after the change in settings (at time zero, $t_0$) is observed and may be optionally recorded. More specifically, in one embodiment, the controller 202 may determine whether the improvement is positive or negative. The toggling process may be repeated a number of times to ensure that the observed differences are due to the changes in the control settings and not due to changes in environmental conditions, e.g. wind speed, wind direction, etc. By changing the control settings back and forth a number of times, an average direction in improvement from A to B can be concluded (e.g. power consistently goes up or goes down). As such, a new test setting, e.g. C, may be chosen and the toggling process may be repeated until a conclusion can be drawn between setting C and the prior optimum point (i.e. either A or B). The process is repeated a suitable number of times until a peak is determined (e.g. the average direction in improvement between two control settings starts to go down).

In various embodiments, the parameters to be optimized may be one of the following: a blade pitch, a Tip Speed Ratio (TSR), a yaw offset (i.e. actively yawing the nacelle left or right of the wind direction), or similar. As such, a step size is established for each parameter, e.g. 0.5 degrees for blade pitch, 10% TSR, and/or one degree for yaw offset. In one embodiment, for example, the controller 202(a) operates the wind turbine at a first setting A for a predetermined time period, e.g. 60 seconds. The controller 202 then (b) changes from setting A to a second setting B and (c) operates the wind turbine at setting B for a predetermined time period, e.g. 60 seconds. In addition, the controller 202 is configured to (d) compare an average of a response parameter for setting A and setting B. For example, the response to generator power and/or generator speed may be observed after each change is made. Further, the response parameter may be one of a power output or a structural load of the wind turbine. More specifically, as mentioned, the response parameter may be the direction that a power output moves across the change in the control setting, i.e. the derivative of power with respect to time. The controller 202 can then repeat steps (a) through (d) above, but switches from setting A back to setting B. As such, in one embodiment, if the controller 202 expects a positive change from setting A to setting B, then the controller 202 should expect a negative change going back from setting B to setting A. Such a process provides the controller 202 with two test settings instead of one, thereby increasing the confidence in the chosen control setting and potentially reducing the number of cycles needed.

The process is then repeated a predetermined number of times to guarantee a statistically significant number of tests. More specifically, in one embodiment, the process may be repeated for a number of different operating ranges, e.g. from 200 kilowatts (KW) to 800 KW, then again for 800 KW to 1100 KW, then again for 1100 KW to 1400 KW. As such, the optimum control setting may be determined for each region since the optimum control setting for each region may differ. It should be understood by those skilled in the art that the ranges and/or regions may have any suitable size so as to ensure that the controller 202 can obtain a statistically significant number of data points in a relatively short amount of time. In addition, instead of power, the regions may be based on another suitable operating parameter, e.g. wind speed.

A "statistically significant number" is defined herein as greater than a minimum number of toggles (e.g. from A to B at least 10 times) combined with a statistical uncertainty that is less than a target value (e.g. 0.3%). In other embodiment, the "statistically significant number" is defined herein as a maximum number of toggles regardless of the statistical uncertainty (e.g. 50 toggles). In one embodiment, the maximum number of toggles may be determined from a statistical sample size calculation that includes the standard deviation of the toggle results and the target uncertainty value.

In a further embodiment, the controller 202 is configured to stop collecting operating data when a null hypothesis is met. For example, the null hypothesis may be that the derivative of power, i.e. the mean change in power is zero. As such, once the controller 202 has enough operating data to reject the null hypothesis for both the setting A to setting B derivative and setting B to setting A derivative, then the controller 202 can determine a positive or negative sign (+/−) of setting B and setting A, as well as their magnitudes. As shown in FIG. 10, their signs should be opposite in nature, whereas their magnitudes should be roughly the same. As such, the controller 202 can determine the benefit of the change. In a further embodiment, the controller 202 may also include an alternative stopping criterion where the null hypothesis is accepted, i.e. settings A and B produce roughly the same performance.

In addition, the controller 202 is configured to normalize the control settings for a predetermined time period before and after the change in control setting. More specifically, the controller 202 may determine (i) the mean change from A to B, (ii) the standard deviation from A to B, and/or (iii) the number of changes from A to B. As such, the controller 202 can determine (iv) a statistical uncertainty of the standard deviation and/or the number of changes. The controller 202 then repeats steps (i) through (iv) for setting B back to setting A. The process is then repeated a statistically significant number of times. The controller 202 is then configured to determine whether setting A is better than setting B. More specifically, in one embodiment, the response parameter of setting A is compared to the response parameter of setting B. For example, in one embodiment, the controller 202 can determine a percent power increase expected from the change in the control settings from setting A to setting B. The controller 202 then chooses one or more new setting(s) to compare based on the conclusions of setting A versus setting B. The process is repeated with the new setting(s) until the optimum setting(s) is identified for the wind turbine 100. For example, in one embodiment, the process may begin with setting A and setting B. Based on the percent power increase from the different settings, the controller 202 may determine that setting B is the preferred set point between A and B. As such, the process is repeated with setting B and new setting C, then C and D, then D and E. The percent power increase at setting E, however, starts to go down. As such, setting D may be chosen as the optimal set point since the average direction in improvement between setting D and E goes down. Once the optimal set points are determined for the various operating parameters, the controller 202 is configured to operate the wind turbine 100 based on the new optimal set points.

The hill-climbing method described herein provides many advantages not present in the prior art. For example, one or more parameters of the wind turbine may be optimized without having to collect, download, and post-process data before determining whether conclusions can be drawn from the data. As such, the toggling method eliminates the need for a skilled data analyst to post-process the data. In addition, in one embodiment, the toggling method implemented by the controller 202 is configured to stop based on simple statistics, rather than having a fixed stopping criterion.

Exemplary embodiments of a wind turbine, a controller for a wind turbine, and a method for optimizing wind turbine operation are described above in detail. The method, wind turbine, and controller are not limited to the specific embodiments described herein, but rather, components of the wind turbine and/or the controller and/or steps of the method may be utilized independently and separately from other components and/or steps described herein. For example, the controller and method may also be used in combination with other power systems and methods, and are not limited to practice with only the wind turbine system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing an operation of a wind turbine, the method comprising:

generating operating data for at least one operational parameter of the wind turbine for predetermined time period at different operating ranges, wherein generating operating data includes operating the wind turbine at one or more of a blade pitch, a tip speed ratio, or a yaw offset at a first setting A for the predetermined time period and at a second setting B for the predetermined time period, and wherein the operating data includes one or more response parameters defining a generator power, a generator speed, a power output, or a structural load at the first setting A for the predetermined time period and at the second setting B for the predetermined time period;

toggling back and forth between the first setting A and the second setting B a predetermined number of times;

averaging the one or more response parameters for the setting A and the second setting B;

determining at least one optimal set point for the at least one operational parameter by, comparing the average of the one or more response parameters for the first setting A with the average of the one or more response parameters of the second setting B, and operating the wind turbine based on the optimal set point.

2. The method of claim 1, further comprising calculating an uncertainty quantifier of at least a portion of the operating data, wherein calculating the uncertainty quantifier comprises:

calculating one or more distribution parameters that characterize the operating data, wherein the distribution parameters comprises a standard deviation of at least a portion of the operating data; and determining the uncertainty quantifier as a function of a standard deviation.

3. The method of claim 1, wherein the operating data further comprises any one of or a combination of a wind speed, one or more power curves, a torque output, a temperature, a pressure, a rotor speed, an air density, a predicted power output, a bin average power output, a wind peak, a wind turbulence, a wind shear, or a wind direction.

4. The method of claim 1, wherein generating operating data further comprises at least one of monitoring operating data via one or more sensors or estimating operating data via a computer model.

5. The method of claim 1, further comprising determining a robustness measurement of at least a portion of the operating data, the robustness measurement indicating the tendency of the operating data to be affected by outliers present in the operating data, wherein the robustness measurement is a function of a distribution of the at least a portion operating data, wherein determining the robustness measurement of at least a portion of the operating data further comprises utilizing at least one of: a standard deviation of the at least one operational parameter, a breakdown point, an influence function, a trimmed mean of the at least one operational parameter, or a sensitivity curve.

6. The method of claim 5, wherein determining the robustness measurement further comprises calculating a partial differentiation with respect to at least one of the standard deviation, an infinitesimal change in input parameters, or a perturbation around an equilibrium point of one or more operational parameters.

7. The method of claim 1, further comprising calculating a standard deviation for a plurality of operational parameters and determining a difference between the standard deviations of each of the operational parameters.

8. The method of claim 1, further comprising determining the at least one optimal set point for the operational parameter as a function of an Annual Energy Production (AEP) gain of the wind turbine, wherein the AEP gain comprises a ratio of the AEP at the optimal set point and the AEP at a baseline set point.

9. The method of claim 1, wherein determining the at least one optimal set point for the operational parameter further comprises utilizing a multi-objective optimization function, wherein the multi-objective optimization function comprises at least one of a cost function, a loss function, or a transfer function.

10. The method of claim 9, wherein determining the optimal set point for the operational parameter further comprises:

generating an optimal power curve based on the multi-objective optimization function; and determining the optimal set point based on the optimal power curve.

11. The method of claim 10, wherein the optimal power curve comprises a Pareto frontier.

12. The method of claim 1, wherein the optimal set point comprises a set point for at least one of the following: a pitch angle, a yaw angle, a generator speed, a power output, a torque output, and a rotor speed.

13. A system for optimizing an operation of a wind turbine, the system comprising:

a processor communicatively coupled to one or more sensors, the processor configured to:

generate operating data for at least one operational parameter of the wind turbine for a predetermined time period at different operating ranges, wherein generating operating data includes operating the wind turbine at one or more of a blade pitch, a tip speed ratio, or a yaw offset at a first setting A for the predetermined time period and at a second setting B for the predetermined time period, and wherein the operating data includes one or more response parameters defining a generator power, a generator speed, a power output, or a structural load at the first setting A for the predetermined time period and at the second setting B for the predetermined time period;

toggle back and forth between the first setting A and the second setting B a predetermined number of times;

average the one or more response parameters for the first setting A and the second setting B; and determine at least one optimal set point for the operational parameter by comparing the average of the one or more response parameters for the first setting A with the average of the one or more response parameters for the second setting B, and operating the wind turbine based on the optimal set point.

14. A method for optimizing an operation of a wind turbine, the method comprising:

operating the wind turbine at a first setting A for a predetermined time period, wherein the first setting A includes one or more of a blade pitch, a tip speed ratio, or a yaw offset, operating the wind turbine at a second setting B for a predetermined time period, wherein the second setting B includes one or more of a blade pitch, a tip speed ratio, or a yaw offset different from the first setting A, toggling back and forth between the first setting A and the second setting B a predetermined number of times;

comparing an average of a response parameter for the first setting A with an average of a response parameter for the second setting B, wherein the response parameters for the first setting A and the second setting B include one or more of a generator power, a generator speed, a power output, or a structural load, determining a new setting C, wherein the new setting C includes one or more of a blade pitch, a tip speed ratio, or a yaw offset different from the first setting A and the second setting B, and operating the wind turbine at the new setting C.

15. The method of claim 14, further comprising observing a direction of an improvement in power before and after a change between the first setting A and the second setting B, wherein the direction of the improvement is negative or positive.

16. The method of claim 14, wherein the predetermined number of times defines a statistically significant number defined as greater than a minimum number of toggles from the first and second settings A to B combined with a statistical uncertainty that is less than a target value.

17. The method of claim 14, wherein the process is repeated at different operating ranges.

* * * * *